(12) United States Patent
Sakura et al.

(10) Patent No.: US 7,840,910 B2
(45) Date of Patent: Nov. 23, 2010

(54) METHOD OF MANAGING INFORMATION PROCESSING APPARATUS, PROGRAM FOR METHOD OF MANAGING INFORMATION PROCESSING APPARATUS, RECORDING MEDIUM RECORDING PROGRAM FOR METHOD OF MANAGING INFORMATION PROCESSING APPARATUS, INFORMATION PROCESSING APPARATUS AND INFORMATION PROCESSING SYSTEM

(75) Inventors: Kohei Sakura, Kanagawa (JP); Masato Matoba, Tokyo (JP); Kyoko Sugizaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 185 days.

(21) Appl. No.: 11/770,159

(22) Filed: Jun. 28, 2007

(65) Prior Publication Data

US 2008/0141173 A1 Jun. 12, 2008

(30) Foreign Application Priority Data

Jul. 4, 2006 (JP) ............................. 2006-184132

(51) Int. Cl.
*G06F 3/048* (2006.01)
(52) U.S. Cl. .................... 715/810; 715/835; 715/838; 715/821; 715/762; 715/763
(58) Field of Classification Search ................ 715/810, 715/835, 838, 840, 845, 821, 825, 762–764
See application file for complete search history.

(56) References Cited

U.S. PATENT DOCUMENTS 5,953,008 A * 9/1999 Hagiuda ..................... 345/630

6,536,965 B2 * 3/2003 Nakajima ..................... 400/62

(Continued)

FOREIGN PATENT DOCUMENTS

JP 02-117218 5/1990

(Continued)

OTHER PUBLICATIONS

A Japanese Office action dated Sep. 25, 2008, from the Japanese Patent Office for the associated Japanese Patent Application No. 2006-184132.
Japanese Office Action dated Jul. 24, 2008 for Application No. 2006-184132.

*Primary Examiner*—Tadeese Hailu
(74) *Attorney, Agent, or Firm*—SNR Denton US LLP

(57) ABSTRACT

In a method of managing an information processing apparatus displaying a menu screen in which plural menus are arranged and receiving selection of the menus, the information processing apparatus includes a display unit displaying the menu screen, an image data storage unit storing image data of the menus which can be displayed on the menu screen, an information recording unit recording menus displayed on the menu screens and menu display information in which the order of arranging the menus in the menu screen is recorded, and a control unit displaying the menu screen on the display unit based on the menu display information recorded in the information recording unit and the image data recorded in the image data storage unit, and the method of managing the information processing apparatus includes a step of creating menu display information and a step of recording menu display information created in the step of creating menu display information in the information recording unit to change the order of arrangement of the menus at least to be displayed on the menu screen.

11 Claims, 6 Drawing Sheets

U.S. PATENT DOCUMENTS

| | | | |
|---|---|---|---|
| 6,657,702 B1 * | 12/2003 | Chui et al. | 355/40 |
| 2002/0091766 A1 * | 7/2002 | Shiimori et al. | 709/203 |
| 2003/0074373 A1 * | 4/2003 | Kaburagi et al. | 707/104.1 |
| 2004/0131336 A1 * | 7/2004 | Matsuno et al. | 386/95 |
| 2005/0057545 A1 * | 3/2005 | Tanabe | 345/204 |
| 2005/0185949 A1 * | 8/2005 | Ueda | 396/310 |
| 2006/0088284 A1 * | 4/2006 | Shen et al. | 386/52 |
| 2006/0204140 A1 * | 9/2006 | Ueda et al. | 382/305 |
| 2007/0076255 A1 * | 4/2007 | Hamashima et al. | 358/1.16 |
| 2007/0165968 A1 * | 7/2007 | Terayoko | 382/305 |
| 2007/0283234 A1 * | 12/2007 | Hung | 714/814 |
| 2008/0092080 A1 * | 4/2008 | Ichikawa et al. | 715/838 |
| 2008/0189766 A1 * | 8/2008 | Bell et al. | 726/3 |

FOREIGN PATENT DOCUMENTS

| | | |
|---|---|---|
| JP | 02-293924 | 12/1990 |
| JP | 07-182128 | 7/1995 |
| JP | 2003-067118 | 3/2003 |
| JP | 2003-216632 | 7/2003 |
| JP | 2005-342967 | 12/2005 |
| JP | 2005-352684 | 12/2005 |
| JP | 2006-079414 | 3/2006 |
| WO | 2005114363 A1 | 12/2005 |

* cited by examiner

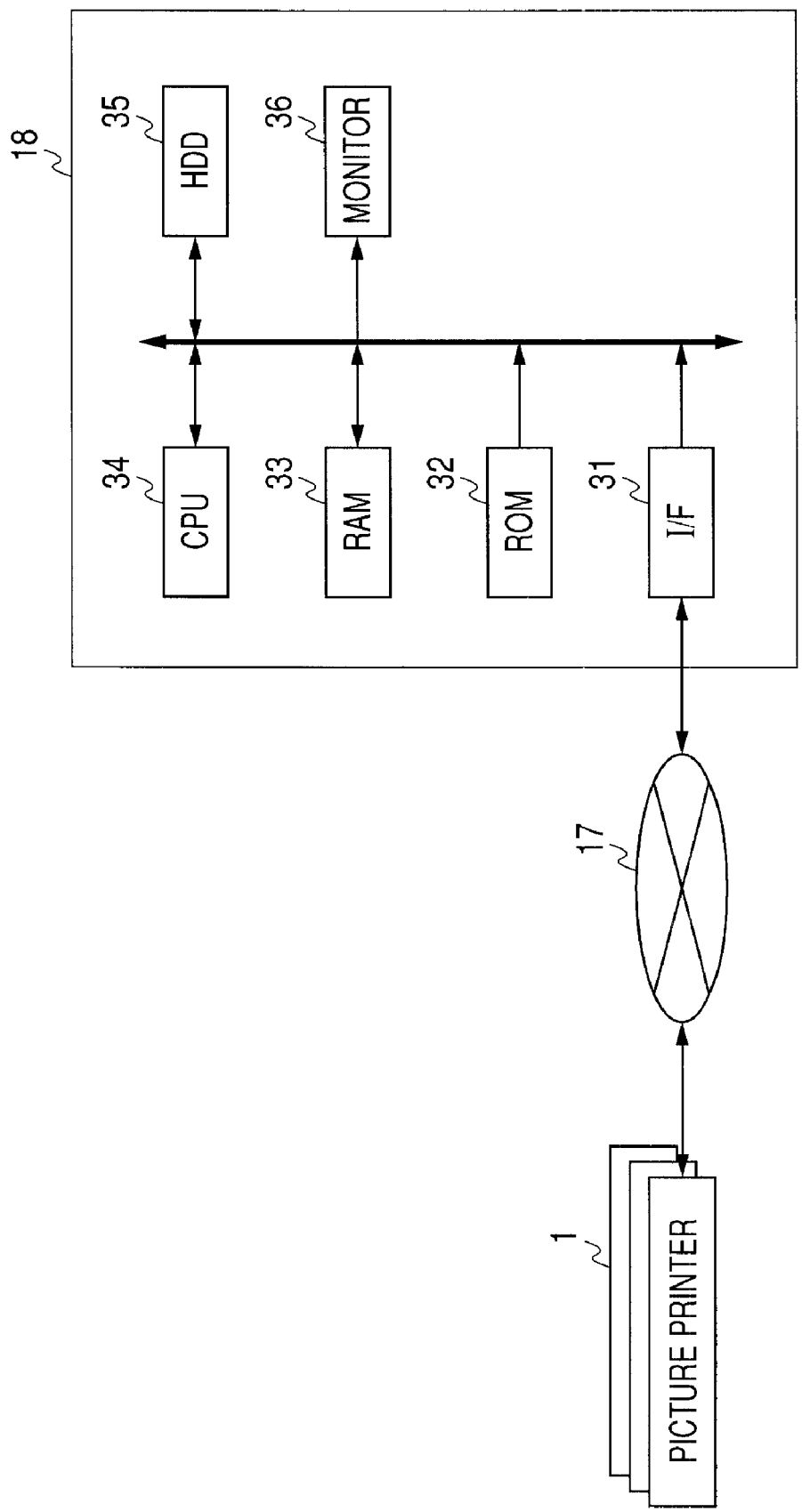

METHOD OF MANAGING INFORMATION PROCESSING APPARATUS, PROGRAM FOR METHOD OF MANAGING INFORMATION PROCESSING APPARATUS, RECORDING MEDIUM RECORDING PROGRAM FOR METHOD OF MANAGING INFORMATION PROCESSING APPARATUS, INFORMATION PROCESSING APPARATUS AND INFORMATION PROCESSING SYSTEM

CROSS REFERENCE TO RELATED APPLICATIONS

The present invention contains subject matter related to Japanese Patent Application JP 2006-184132 filed in the Japanese Patent Office on Jul. 4, 2006, the entire contents of which being incorporated herein by reference.

BACKGROUND OF THE INVENTION

1. Field of the Invention

The invention relates to a method of managing an information processing apparatus, a program for a method of managing an information processing apparatus, a recording medium recording a program for a method of managing an information processing apparatus, an information processing apparatus and an information processing system, and can be applied to a terminal apparatus which prints photographs. The invention is capable of setting information which defines arrangement of menus and/or information specifying menus on which images calling attention are displayed, and is capable of changing the arrangement of the menus and the menus on which images calling attention are displayed, thereby devising display of the menus variously.

2. Description of the Related Art

In recent years, a terminal apparatus which prints photographs taken by an electronic still camera at large photo processing stores, drug stores and the like. The terminal apparatus is an apparatus which prints photographs by being operated by the user himself/herself, and when a recording medium such as a memory card in which imaged results are recorded is mounted, various menus are displayed, and imaged results recorded in the recording medium are displayed in a list by, for example, thumbnail images by selecting the menu. In the list display, when printing is instructed by setting the number of printing of imaged results, photographs are printed in the set number of pieces and the size.

Concerning the terminal apparatus, for example, in JP-A-2005-342967, a configuration is disclosed, in which a function of judging resolution is provided, and high-quality photographs are selectively printed.

In stores where such terminal apparatus is installed, display of products is devised in various manners to promote eagerness to buy of users and for other purposes.

Also in the terminal apparatus which prints photographs, it is considered that usability of this kind of terminal apparatus can be further improved if display of menus operated by the user which is corresponding to the display of products can be devised variously.

SUMMARY OF THE INVENTION

It is desirable to provide a method of managing an information processing apparatus, a program for a method of managing an information processing apparatus, a recording medium recording a program for a method of managing an information processing apparatus, an information processing apparatus and an information processing system which are capable of variously devising display of menus.

According to an embodiment of the invention, in a method of managing an information processing apparatus displaying a menu screen in which plural menus are arranged and receiving selection of the menus, the information processing apparatus includes a display unit displaying the menu screen, an image data storage unit storing image data of the menus which can be displayed on the menu screen, an information recording unit recording menus displayed on the menu screen and menu display information in which the order of arranging the menus in the menu screen is recorded, and a control unit displaying the menu screen on the display unit based on the menu display information recorded in the information recording unit and the image data recorded in the image data storage unit, and the method of managing the information processing apparatus includes a step of creating menu display information, and a step of recording menu display information created in the step of creating menu display information in the information recording unit to change the order of arranging the menus at least to be displayed on the menu screen.

According to an embodiment of the invention, in a method of managing an information processing apparatus displaying a menu screen in which plural menus are arranged and receiving selection of the menus, the information processing apparatus includes a display unit displaying the menu screen by superimposing images calling attention on specific menus in the plural menus, an image data storage unit storing image data of the menus which can be displayed on the menu screen and image data of the images calling attention, an information recording unit recording menu display information having at least information specifying menus on which images calling attention are displayed, a control unit displaying the menu screen on the display unit based on the menu display information recorded in the information recording unit and image data recorded in the image data storage unit, and the method of managing the information processing apparatus includes a step of creating menu display information and a step of recording menu display information created in the step of creating menu display information in the information recording unit to change menus on which images calling attention are displayed.

According to an embodiment of the invention, in a program for a method of managing an information processing apparatus displaying a menu screen in which plural menus are arranged and receiving selection of menus, information processing apparatus includes a display unit displaying the menu screen, an image data storage unit storing image data of the menus which can be displayed on the menu screen, an information recording unit recording menus displayed on the menu screen and menu display information in which the order of arranging the menus in the menu screen is recorded, and a control unit displaying the menu screen on the display unit based on the menu display information recorded in the information recording unit and the image data recorded in the image data storage unit, and the program for the method of managing the information processing apparatus includes a step of creating menu display information, and a step of recording menu display information created in the step of creating menu display information in the information recording unit to change the order of arranging of the menus at least to be displayed on the menu screen.

According to an embodiment of the invention, in a program for a method of managing an information processing apparatus displaying a menu screen in which plural menus are arranged and receiving selection of menus, information processing apparatus includes a display unit displaying the menu screen by superimposing images calling attention on specific menus in the plural menus, an image data storage unit storing image data of the menus which can be displayed on the menu screen and image data of the images calling attention, an information recording unit recording menu display information having at least information specifying menus on which images calling attention are displayed, a control unit displaying the menu screen on the display unit based on the menu display information recorded in the information recording unit and image data recorded in the image data storage unit, and the program for the method of managing the information processing apparatus includes a step of creating menu display information and recording menu display information created in the step of creating menu display information in the information recording unit to change menus on which images calling attention are displayed.

According to an embodiment of the invention, in a recording medium recording a program for a method of managing an information processing apparatus displaying a menu screen in which plural menus are arranged and receiving selection of menus, the information processing apparatus includes a display unit displaying the menu screen, an image data storage unit storing image data of the menus which can be displayed on the menu screen, an information recording unit recording menus displayed on the menu screen and menu display information in which the order of arranging the menus in the menu screen is recorded, and a control unit displaying the menu screen on the display unit based on the menu display information recorded in the information recording unit and the image data recorded in the image data storage unit, and the program for the method of managing the information processing apparatus includes a step of creating menu display information, and a step of recording menu display information created in the step of creating menu display information in the information recording unit to change the order of arranging the menus at least to be displayed on the menu screen.

According to an embodiment of the invention, in a recording medium recording a program for a method of managing an information processing apparatus displaying a menu screen in which plural menus are arranged and receiving selection of menus, the information processing apparatus includes a display unit displaying the menu screen by superimposing images calling attention on specific menus in the plural menus, an image data storage unit storing image data of the menus which can be displayed on the menu screen and image data of the images calling attention, an information recording unit recording menu display information having at least information specifying menus on which images calling attention are displayed, a control unit displaying the menu screen on the display unit based on menu display information recorded in the information recording unit and image data recorded in the image data storage unit, and the program of the method of managing the information processing apparatus includes a step of creating menu display information, and a step of recording menu display information created in the step of creating menu display information in the information recording unit to change menus on which images calling attention are displayed.

According to an embodiment of the invention, an information processing apparatus displaying a menu screen in which plural menus are arranged and receiving selection of the menus includes a display unit displaying the menu screen, an image data storage unit storing image data of the menus which can be displayed on the menu screen, an information recording unit recording menus displayed on the menu screen and menu display information in which the order of arranging the menus in the menu screen is recorded, a control unit displaying the menu screen on the display unit based on the menu display information recorded in the information recording unit and the image data recorded in the image data storage unit, a menu display information creation unit creating the menu display information, and a menu display information recording unit recording the menu display information created in the menu display information creation unit in the information recording unit to change the order of arranging the menus at least to be displayed on the menu screen.

According to an embodiment of the invention, an information processing apparatus displaying a menu screen in which plural menus are arranged and receiving selection of the menus includes a display unit displaying the menu screen by superimposing images calling attention on specific menus in the plural menus, an image data storage unit storing image data of the menus which can be displayed on the menu screen and image data of the images calling attention, an information recording unit recording menu display information having at least information specifying menus on which images calling attention are displayed, a control unit displaying the menu screen on the display unit based on menu display information recorded in the information recording unit and image data recorded in the image data storage unit, a menu display information creation unit creating the menu display information, and a menu display information recording unit recording the menu display information created in the menu display information creation unit in the information recording unit to change menus on which images calling attention are displayed.

According to an embodiment of the invention, in an information processing system in which a terminal apparatus is managed by a host apparatus, a menu screen in which plural menus are arranged is displayed and selection of the menus are received by the terminal apparatus, the terminal apparatus includes a display unit displaying the menu screen, an image data storage unit storing image data of the menus which can be displayed on the menu screen, an information recording unit recording menus displayed on the menu screen and menu display information in which the order of arranging the menus in the menu screen is recorded, and a control unit displaying the menu screen on the display unit based on the menu display information recorded in the information recording unit and the image data recorded in the image data storage unit, and the host apparatus includes a menu display information creation unit creating the menu display information, and a menu display information recording unit recording the menu display information created in the menu display information creation unit in the information recording unit through a communication means to change the order of arranging the menus at least to be displayed on the menu screen.

According to an embodiment of the invention, in an information processing system in which a terminal apparatus is managed by a host apparatus, a menu screen in which plural menus are arranged is displayed and selection of the menus are received by the terminal apparatus, the terminal apparatus includes a display unit displaying the menu screen by superimposing images calling attention on specific menus in the plural menus, an image data storage unit storing image data of the menus which can be displayed on the menu screen and image data of the images calling attention, an information recording unit recording menu display information having at least information specifying menus on which images calling attention are displayed, and a control unit displaying the menu screen on the display unit based on menu display information recorded in the information recording unit and image data recorded in the image data storage unit, and the host apparatus includes a menu display information creation unit creating the menu display information, and a menu display information recording unit recording the menu display information created in the menu display information creation unit in the information recording unit through a communication means to change menus on which images calling attention are displayed.

According to the configuration of the above embodiment, in the step of creating menu display information, menu display information is created so as to display the menu screen in a desired menu arrangement, and the menu screen can be displayed based on the menu display information, therefore, it is possible to variously change the arrangement of menus to be displayed on the menu screen to devise the display of menus variously by the setting of the menu display information.

According to the configuration of the above embodiment, in the step of creating menu display information, menu display information is created so as to display images calling attention are displayed on desired menus, and the menu screen can be displayed based on the menu display information, therefore, it is possible to variously change menus on which images calling attention are displayed to devise the display of menus variously by the setting of the menu display information.

According to the configuration of the above embodiment, in the menu display information creation unit, menu display information is created so as to display the menu screen in a desired menu arrangement, and the menu screen can be displayed based on the menu display information, therefore, it is possible to variously change the arrangement of menus to be displayed on the menu screen to devise the display of menus variously by the setting of the menu display information.

According to the configuration of the above embodiment, in the menu display information creation unit, menu display information is created so as to display images calling attention on desired menus, and the menu screen can be displayed based on the menu display information, therefore, it is possible to variously change the menus on which images calling attention are displayed to devise the display of menus variously by the setting of the menu display information.

According to embodiments of the invention, display of menus can be variously devised.

BRIEF DESCRIPTION OF THE DRAWINGS

FIG. 6 is a block diagram showing a host apparatus of the picture printer of FIG. 2.

DESCRIPTION OF THE PREFERRED EMBODIMENTS

Hereinafter, embodiments of the invention will be described in detail with reference to the drawings appropriately.

Embodiment 1

1. Configuration of the Embodiment

Figure 2:
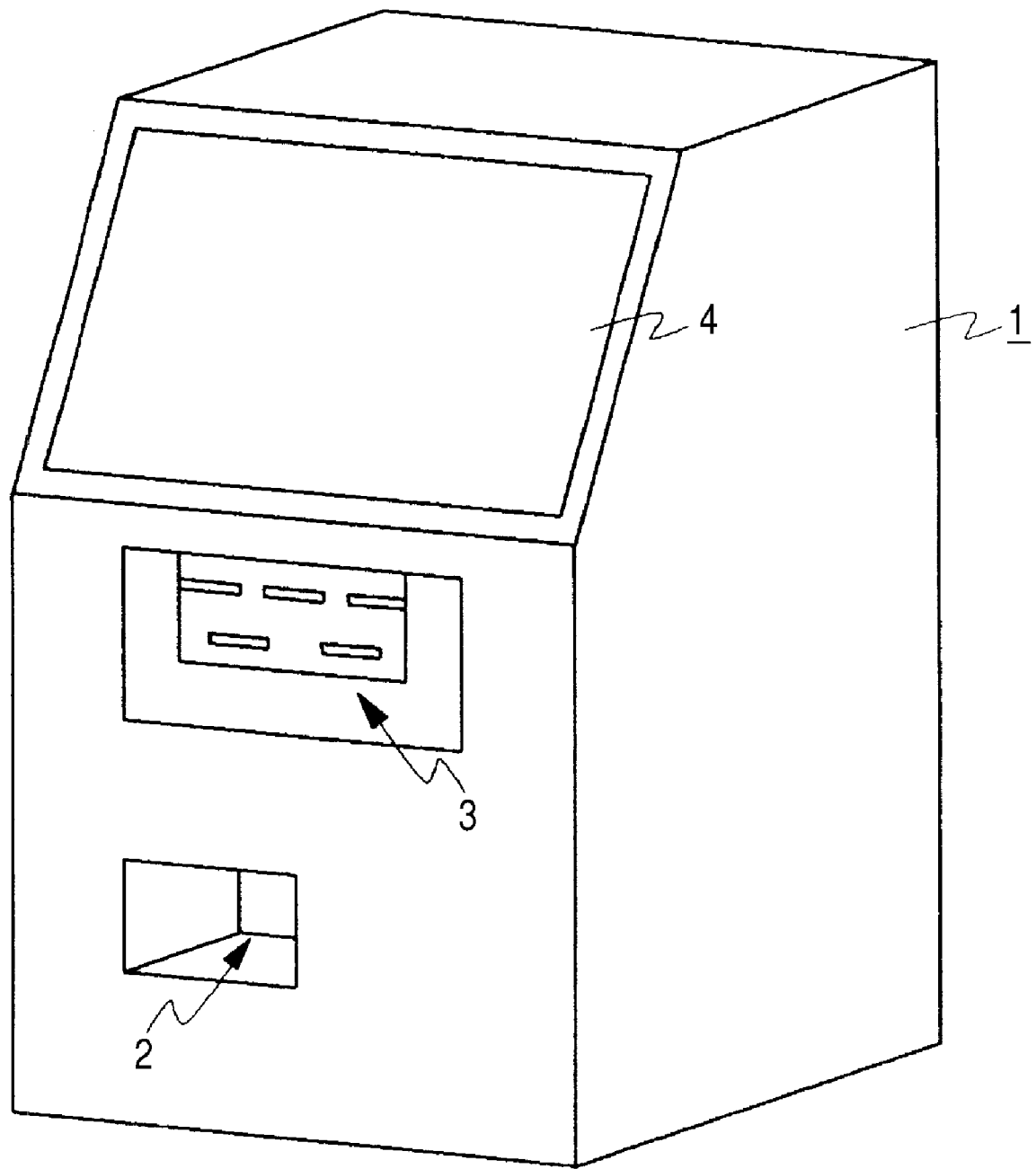
FIG. 2 is a perspective view showing the picture printer of Embodiment 1 of the invention.

FIG. 2 is a perspective view showing a picture printer of Embodiment 1 of the invention. The picture printer 1 is a terminal apparatus which prints photographs taken by an electronic still camera, which is installed at each store and prints photographs of picture data recorded in a memory card and the like.

The picture printer 1 is formed in a long rectangular parallelepiped shape as a whole, and a take-out opening 2 for taking out photographs and the like as printed results at the front thereof. At an upper side of the take-out opening 2, an insert opening 3 for recording media, to which respective recording media such as a memory card, a magnetic disc, an optical disc are mounted, a card insertion slot used for accounting processing and the like are provided. In the picture printer 1, an image display unit 4 on which a touch panel is arranged is provided at an upper side of the insertion opening 3, and selection from various menus displayed on the image display unit 4 is detected by the touch panel to receive operation by the user.

Figure 3:
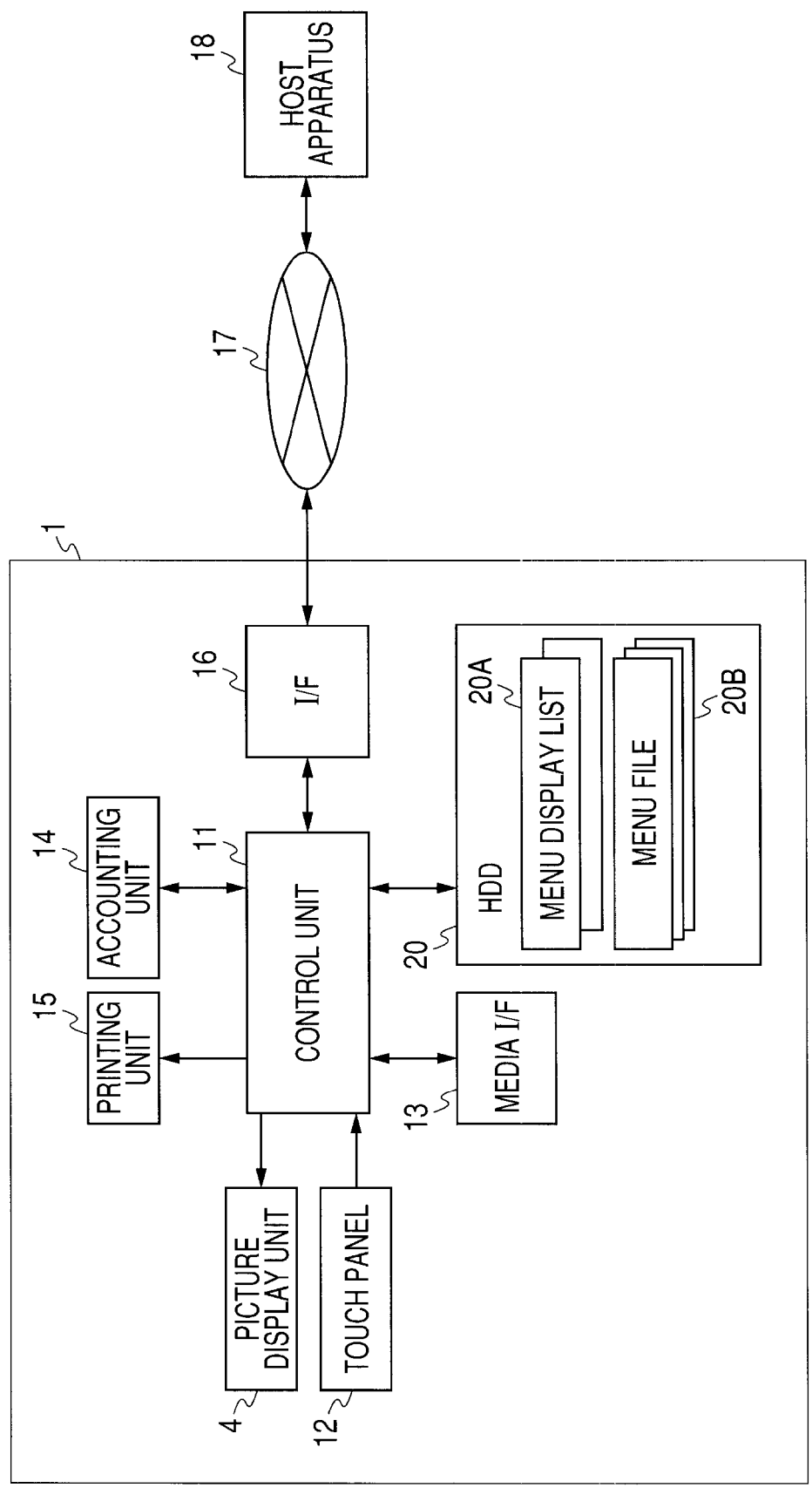
FIG. 3 is a block diagram showing the picture printer of Embodiment 1 of the invention.

FIG. 3 is a block diagram showing the picture printer 1. In the picture printer 1, the image display unit 4 displays various menus necessary for processing the picture printer 1 by control of a control unit 11, and a touch panel 12 notifies selection of menus by the user to the control unit 11. A media interface (media I/F) 13 acquires picture data and like from various recording media inserted into the insertion opening 3 for recording media and notifies them to the control unit 11. The media I/F 13 also records picture data in a blank disc and delivers it to the take-out opening 2. An accounting unit 14 executes a series of processing relating to the accounting. A printing unit 15 prints photographs on the paper and delivers them to the take-out opening 2 by control of the control unit 11. An interface (I/F) 16 is a communication means, which is connected to a host apparatus 18 through a network 17 such as Internet, and various data is transmitted and received between the I/F 16 and the host apparatus 18.

A hard disc unit 20 records and stores a program of the picture printer 1 and various data necessary for executing the program. In the hard disc unit 20, a menu display list 20A and a menu file 20B for setting menu display are provided as one of data necessary for executing the program.

Figure 4:
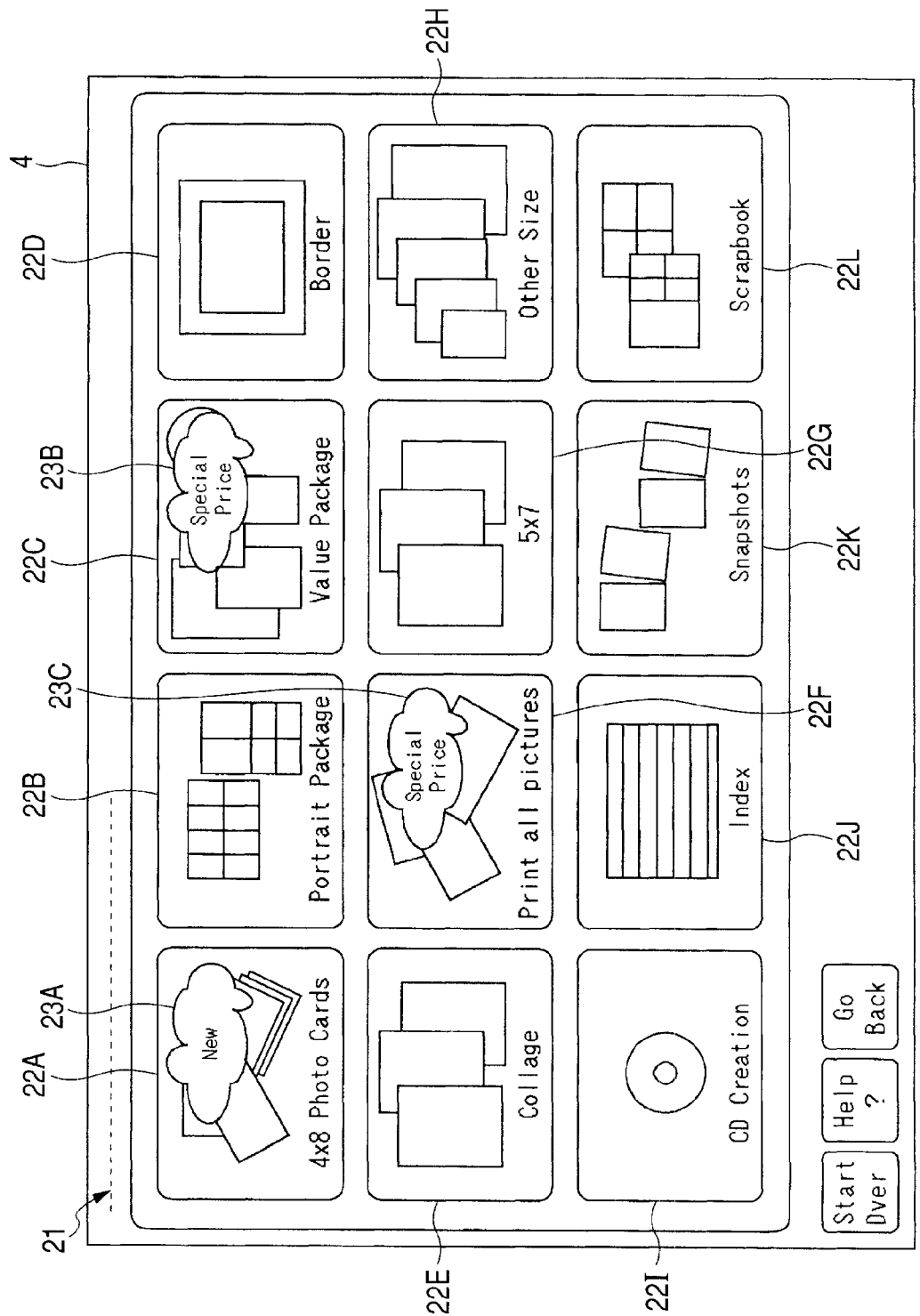
FIG. 4 is a plan view showing a user menu screen in the picture printer in FIG. 2.

FIG. 4 is a plan view showing a user menu screen of the picture printer 1. The user menu screen is one of the menu screens displayed on the image display unit 4, which is the menu screen in which selection of kinds of printing is received. In the user menu screen, a message 21 indicating selection of menus is displayed at the top column, next, menus 22A to 22L for selecting the kind of printing are displayed. In the menus 22A to 22L for setting the kind of printing, the leftmost and top menu (4×8 Photo Cards) is a menu for instructing printing of a so-called photo card. The photo card is a photograph in which a space for writing a message is provided, for example, used as a Christmas card. At next right sections, a menu instructing packaged printing for portraits (Portrait Package), a menu instructing bargain-priced packaged printing (Value Package) are sequentially displayed. The packaged printing means a menu instructing printing of picture data recorded in the recording medium in combinations of plural sizes previously set in the picture printer 1. At a further next right section, a menu instructing printing in which a border by a ribbon pattern and the like is put (Border) is displayed. At a middle and a lower columns, menus instructing kinds of printing similar to the above are displayed. In addition, at a section below the menus 22A to menu 22L, menus such as Return, Help are displayed. On the menus 22A to 22L for selecting the kind of printing, images 23A to 23C ((New), (Special Price) which are images calling attention of users and aiming for promotion are displayed.

The menu files 20B are image data files of menus 22A to 22L for selecting the kind of printing, and image data files of images 23A to 23C for promotion, and bitmap files are applied in the embodiment. The menu file 20B is provided by each menu having possibility of being displayed on the user menu screen, and by each image for promotion set at each menu.

On the other hand, the menu display list 20A is a list which defines display of menus 22A to 22L and display of images 23A to 23C for promotion in the menu screen. Specifically, the menu display list 20A is formed by menus 22A to 22L displayed on the user menu screen, display positions of these menus 22A to 22L, information for specifying menus on which the images 23A to 23C for promotion are displayed, display position information of the images 23A to 23C for promotion in the menus and the like.

That is, the menu display list 20A defines, in the example of FIG. 4, the image data file of the menu 22A (4×8 Photo Cards) instructing printing of photo cards at the display position of the upper column and leftmost section. At the display position of the upper column and next right section, the image data file of the menu 22B (Portrait Package) instructing the package printing for portraits is defined.

The menu display list 20A associates the image data file of each menu so that the images 23A to 23C for promotion are displayed on the menus 22A, 22C and 22F, and defines image data files of the images 23A to 23C for promotion. The menu display list 20A defines detailed display positions of images 23A to 23C for promotion in the menu display positions so as to change display positions to up-and-down, right-and-left minutely in corresponding display positions of menus.

In the menu display list 20A, information indicating valid/invalid is set, and the list is used for display only when valid information is set. The menu display list 20A can define a limited time list which limits a period to be used for display in addition to the standard list. In the limited time list, identification information indicating the limited list and information of a period used for display are set. The time-limited menu display list 20A is a menu display list which defines the user menu screen displayed, for example, during a Christmas season.

The control unit 11 includes a calculation processing unit controlling the whole operation of the picture printer 1, which controls respective units in accordance with the program recorded in the hard disc unit 20. In the embodiment, the program is provided by being installed in the picture printer 1 in advance, however, it is also preferable that the program is provided by being recorded in recording media such as a optical disc, a magnetic disc, a memory card instead, further, provided by being downloaded through networks such as Internet.

Figure 1:
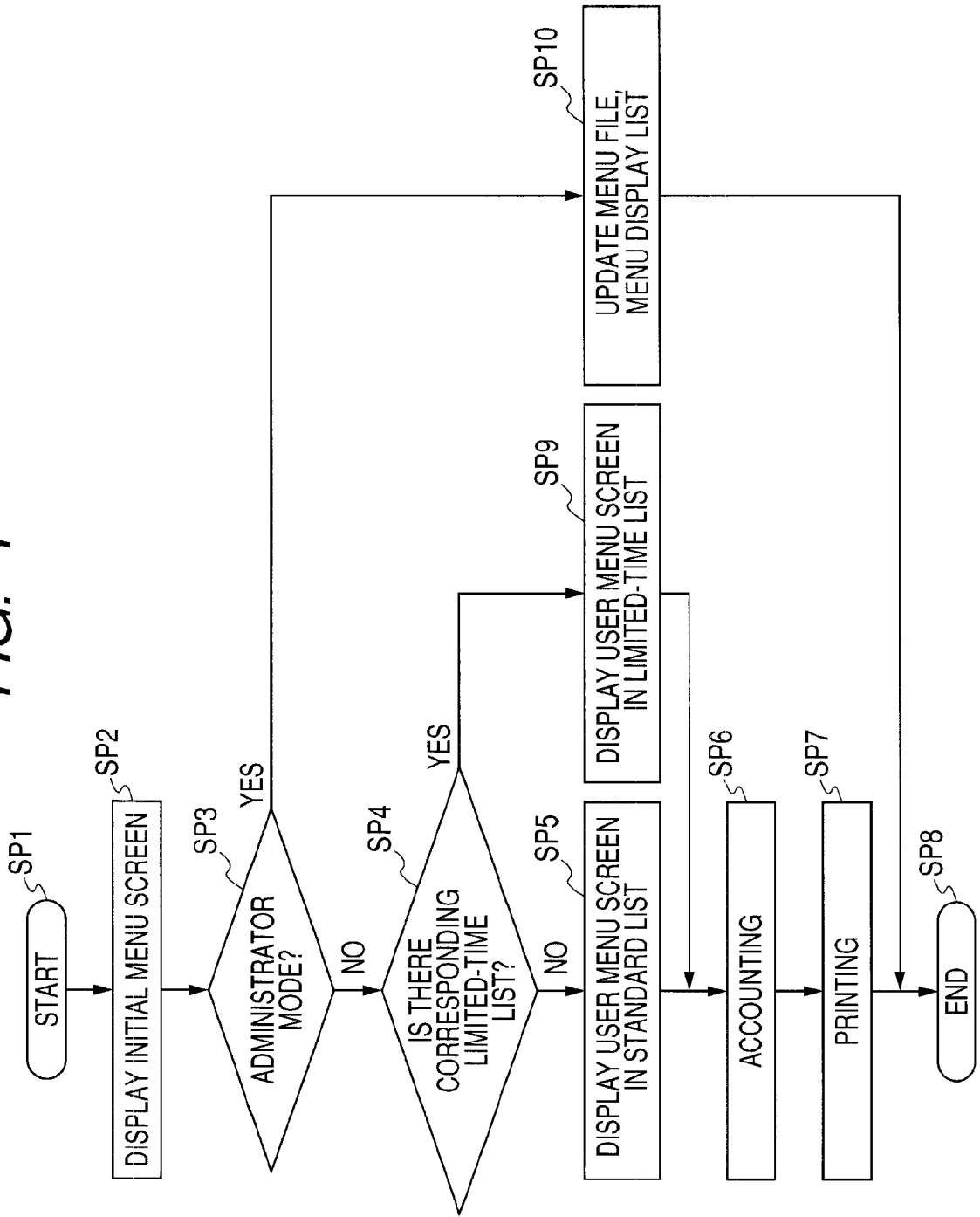
FIG. 1 is a flowchart showing a processing procedure of a control unit in a picture printer of Embodiment 1 of the invention.

FIG. 1 is a flowchart showing a processing procedure of the control unit 11. The control unit 11, when operation of the touch panel 12 is detected during the standby state, proceeds from Step SP1 to Step SP2 by starting the processing procedure. The control unit 11 displays an initial menu screen at the image display unit 4, and when operation of the touch panel 12 is detected in a state in which the initial menu screen is displayed, the control unit 11 proceeds to Step SP3.

In Step SP3, the control unit 11 judges whether the operation of the touch panel 12 detected in Step SP2 is prescribed operation indicating switching of an operation mode to an administrator mode or not. The prescribed operation is operation such that a specific portion of the touch panel 12 is continuously pressed for more than prescribed period of time.

When a negative result is obtained here, the control unit 11 proceeds from Step SP3 to Step SP4, searching valid menu display lists 20A recorded in the hard disc 20. The control unit 11 also detects the time-limited menu display list 20A from the searched menu display list 20A, and judges a period of time used for the display recorded in the time-limited menu display list 20A from the present day and time. Accordingly, the control unit 11 judges whether there is a time limited menu 20A display list in which the present day and time is set during the period of time used for the display or not.

When a negative result is obtained here, the control unit 11 proceeds to Step SP5, opening the menu file 20B in accordance with the records of the standard menu display list 20A recorded in the hard disc unit 20 and displaying the user menu screen at the image display unit 4. The control unit 11 displays a menu screen for receiving setting such as the specific number of printing and a printing object in response to the menu selection in the user menu screen to receive setting for printing.

In sequential Step SP6, the charge necessary for printing is calculated to instruct the user to pay, and operation of the accounting unit 14 is controlled to execute accounting processing. After the accounting processing is completed, in sequential step SP7, operation of the printing unit 15 is controlled and photographs are printed, printed results are delivered at the take-out opening 2. Subsequently, the control unit 11 proceeds to Step SP8 to end the processing procedure, switching operation to the standby state.

On the other hand, when there is the time-limited menu display list 20A in which the present day and time is set in the period of time used for the display, the control unit 11 obtains a positive result in Step SP4, proceeding from Step SP4 to Step SP9. Here, the control unit 11 opens the menu file 20B in accordance with the record of the time-limited menu display list 20A in which the present day and time is set during the period of time used for the display and displays the user menu screen at the image display unit 4. The control unit 11 displays a menu screen for receiving setting such as the specific number of printing and a printing object in response to the menu selection in the user menu screen to receive setting for printing, then, proceeds to Step SP6.

If a positive result is obtained in Step SP3, the control unit 11 proceeds from Step SP3 to Step SP10. The control unit 11 switches the operation mode to the administrator mode, and switches display of the image display unit 4 to a display of the administrator mode. The control unit 11 also receives change and the like of various settings of the picture printer 1 in response to operation of the touch panel 12 in the display of the administrator mode.

Figure 5:
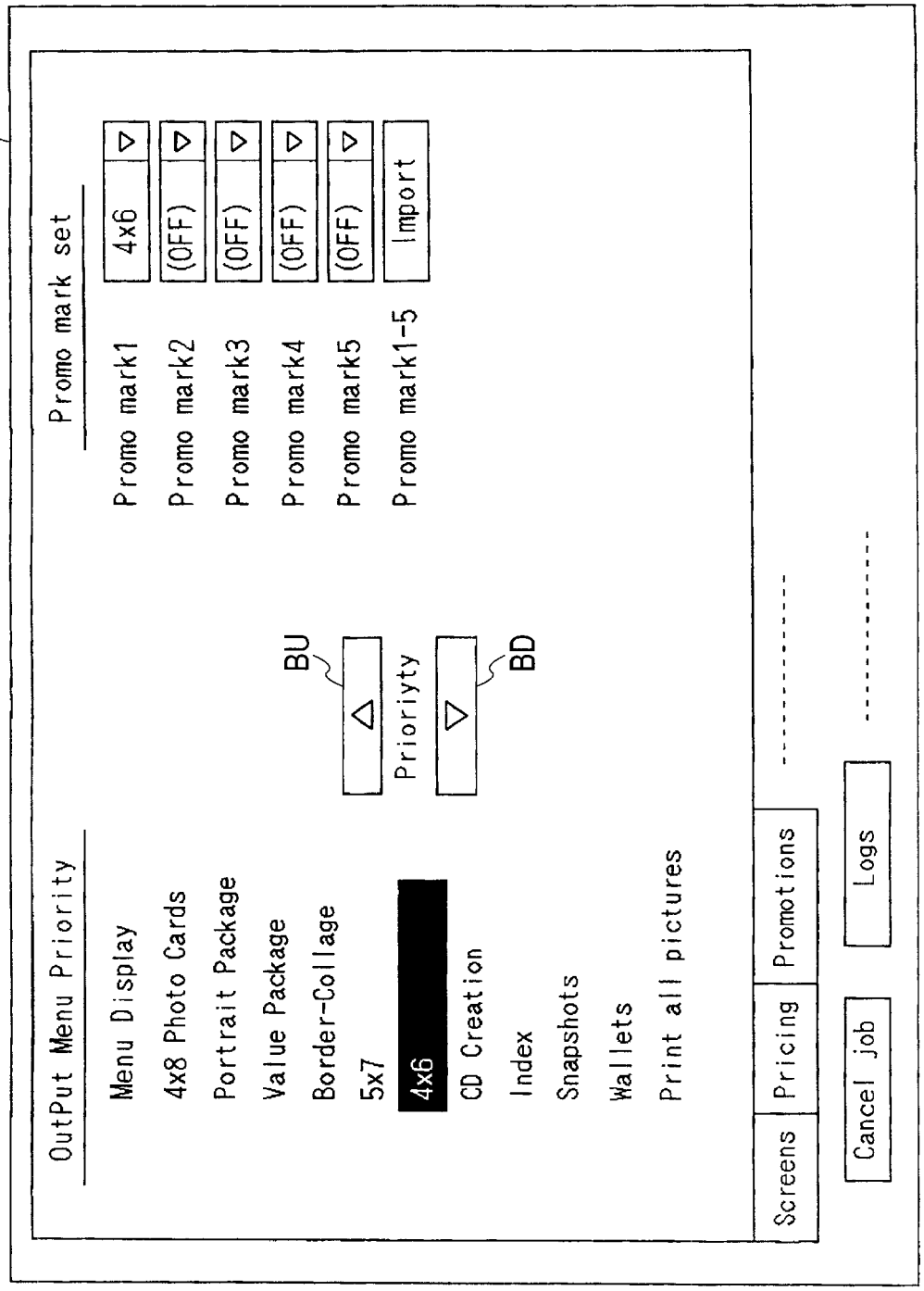
FIG. 5 is a plan view showing a display screen in an administrator mode in the picture printer of FIG. 2.

FIG. 5 is a plan view showing the display of the administrator mode. The receiving screen is formed so as to be able to select setting items by switching display by a tab. The control unit 11 switches the display of the administrator mode in response to the selection of the tab by an operator, and uploads a file to the hard disc unit 20, which is designated by the operator from the recording medium inserted in the insertion opening 3 for the recording medium to add or update the menu file 20B. The picture printer 1 is formed so as to change menu designs to be displayed on the user menu screen variously by the addition and update of the menu file 20B.

The setting of display or undisplay of menus is received, and the selection of menus to be displayed on the user menu screen is received.

Concerning menus to be displayed on the user menu screen, the setting of the order of display is received. FIG. 5 is a setting screen for the order of display of menus. In this case, at the left side from the center of the screen, a list of menus to be displayed on the user menu screen is displayed in the order of display. In the embodiment, the order of display is the order, for example, 3×4 pieces of menu display points described concerning FIG. 5 are scanning in the order of raster scanning. The control unit 11, when any of manus is selected in the list display, performs reverse display of the selected menu and displays up-and-down buttons BU, BD for inputting change of the order at the right side of the menu. The order of the reverse-displayed menu is moved upward or downward in response to the operation of the buttons BU, BD. Accordingly, the control unit 11 receives setting of the order of menu display.

At the right side from the center of the screen, a setting screen for setting menus displaying images for promotion is displayed. The setting screen is formed so as to able to set which image is displayed on which menu by each image for promotion, and so as to be able to set display positions minutely by displaying sub menus if necessary. At the lowest column, a button for importing an image data file for promotion is displayed.

When the operator designates the order of the display of menus and menus of displaying images for promotion by the display shown in FIG. 5, the control unit 11 creates the corresponding menu display list 20A to be recorded in the hard disc unit 20. At this time, the control unit 11 updates the previous menu display list 20A recorded in the hard disc unit 20 in accordance with the designation of the operator, receiving the setting of limited time to be additionally recorded in the hard disc unit 20. In this display, when the operator designates the end of operation, the process proceeds from the Step SP10 to Step SP8 to end the processing procedure, and operation is switched to the standby state.

On the other hand, when activation is instructed from the host apparatus 18 through the interface 16, the control unit 11 starts up the operation mode from the standby state and updates the content of the hard disc unit 20 in accordance with the instruction of the host apparatus 18.

FIG. 6 is a block diagram showing a configuration of the host apparatus 18. The host apparatus 18 is a computer managing plural picture printers 1 installed at respective stores, for example, installed at a head office of respective stores which is at a distant place from the store where the picture printers 1 are installed. Therefore, the host apparatus 18 can be connected to picture printers 1 at respective places through the interface (I/F) 31. A work area is secured in a random access memory (RAM) 33 in accordance with the record of a read only memory (ROM) 32 and a program for administration recorded in a hard disk unit (HDD) 35 is executed at a central processing unit 34 to compile sales and the like of respective picture printers 1.

In the embodiment, the host apparatus 18 is provided with an update program of the user menu screen for adding and updating the menu file 20B and the menu display list 20A of each picture printer 1 as one of applications of the program for administration.

That is, in the host apparatus 18, the central processing unit 34, when the operator starts up the update program of the user menu screen, displays the user menu screen of the picture printer 1 which is currently set at a monitoring device 36. In this case, it is also preferable that the menu file 20B and the menu display list 20A are acquired by accessing to the target picture printer 1 to display the user menu screen, and also preferable to display the screen in according with the record of the host apparatus 18.

Subsequently, the central processing unit 34 receives the change of the menu file 20B and the menu display list 20A in the same manner described about FIG. 1, displaying a preview screen of the user menu screen to upload the changed menu file 20B and the menu display list 20A on the picture printer 1 of the update target by the instruction of the operator.

2. Operation of the Embodiment

In the above configuration, in the picture printer 1 (FIG. 2 and FIG. 3), the user menu screen is displayed on the image display unit 4, and the kind of printing is received by selection from the menus 22A to 22L in the user menu screen. In the picture printer 1, photographs of picture data recorded in the recording medium are printed according to the kind of printing and taken out from the take-out opening 2.

Accordingly, in the picture printer 1, a specific kind of printing is used many times depending on the menus 22A to 22L in the user menu screen. In addition, for example, in the Christmas season, printing for using as Christmas cards is used many times, that is, the specific kind of printing is used many times depending on the seasonable factor.

In the embodiment, the picture printer 1 switches the operation mode to the administrator mode by operation in the picture printer 1 (FIG. 5), image data of menus to be displayed on the user menu screen is uploaded on the picture printer 1 through the recording medium, and images of menus to be displayed on the user menu screen are updated (FIG. 1).

The selection of menus to be displayed on the user menu screen is received, and the order of display is received. Accordingly, in the picture printer 1, for example, in the Christmas season, the menu which is often used at the Christmas season is displayed at the most conspicuous spot such as the leftmost, the top column and the like, thereby increasing eagerness to buy of users. In addition, by differentiating the menus from menus of other picture printers installed at other stores, the menus will have originality. It is also possible to prevent the menus to be banal by continuously giving the user freshness, for example, by changing images of the menus and the order of displaying menus in a certain period of time. The display of the user menu screen can be changed as the matter of course so as to respond to a specific promotion campaign and the like, thereby devising the display variously.

In the picture printer 1, setting for deciding that images for promotion calling attention of users are displayed on which menus is further received, and images for promotion are displayed on the specific menus in accordance with the setting. Also by the setting, the picture printer 1 is capable of increasing the eagerness to buy of users by devising the display variously and allowing the display to have originality. It is also possible to prevent the display to be banal and to change the display of the user menu screen so as to respond to a specific promotion campaign and the like.

In the picture printer 1, the display of menus, images for promotion in the user menu screen is defined by the menu display list 20A. In the picture printer 1, the time-limited menu display list 20A can be set in addition to the standard menu display list 20A, and when the time-limited menu display list 20A is recorded in the hard disc unit 20, and when the present day and time is included in the use period set in the time-limited menu display list 20A, the user menu screen is displayed based on the limited time menu display list 20A instead of the standard menu display list 20A. Accordingly, in the picture printer 1, for example, when the user menu screen is changed only at the time of the Christmas season, a user menu screen particular to the Christmas season can be displayed automatically only by registering the time-limited menu display list 20A, thereby devising the display of menus easily and positively.

Furthermore, in the picture printer 1, the host apparatus 18 can be connected to the picture printer 1 through a communication means and can record the menu display list 20A in the same manner, instead of the setting by the administrator mode in the picture printer 1. Therefore, for example, in plural picture printers 1 managed by the host apparatus 18 at the head office, the user menu screens in all or part of the plural picture printers 1 can be set by the host apparatus 18 at a time, thereby devising variously the display of menus in the plural picture printers 1 more easily.

3. Advantage of the Embodiment

According to the above configuration, information which defines arrangement of menus and information which specifies menus on which images calling attention are displayed can be set, and allowing them to be changed, thereby devising the display of menus variously.

The information which defines the arrangement of menus and/or the information which specifies menus on which images calling attention are displayed are set by the picture printer as the terminal apparatus, thereby devising the display of menus by operation of each terminal apparatus.

Instead of the above, the information which defines the arrangement of menus and/or the information which specifies menus on which images calling attention are displayed are set by the host apparatus, thereby variously devising the display of menus of plural terminal apparatus easily.

Embodiment 2

In the above embodiment, the case in which time information used for display is set in the time-limited user display list was described, however, the invention is not limited to this, and for example, various methods can be applied to schedule management of the time-limited user display list such as a case in which the schedule is managed by recording the user display lists in a time table.

In the above embodiment, the case in which information of menus displayed on the menu screen, information of the order of arrangement of menus in the menu screen and information of menus on which images calling attention are displayed are stored in a form of the list was described, however, the invention is not limited to this, and for example, various method of recording these information can be applied such as a case in which these information is recorded by being listed individually.

In the above embodiment, the case in which still images by bitmap files are displayed as images calling attention was described, however, the invention is not limited to this, and moving pictures such as animation may be applied as images calling attention. In addition, links are set to images calling attention, which further provides audio and moving pictures.

In the above embodiment, the case was described, in which the user menu screen is displayed by allowing both information which defines arrangement of menus and information which specifies menus on which images calling attention are displayed to be set, however, the invention is not limited to this, and it is also preferable that the user menu screen is displayed by allowing either of information to be set.

In the above embodiment, the case in which the invention is applied to the picture printer was described, however, the invention is not limited to this and can be widely applied to various information processing apparatuses which receive operation of users by displaying various menus.

The invention can be applied to a terminal apparatus, for example, which prints photographs.

It should be understood by those skilled in the art that various modifications, combinations, sub-combinations and alterations may occur depending on design requirements and other factors insofar as they are within the scope of the appended claims or the equivalents thereof.

What is claimed is:

1. A method of managing a client information processing apparatus displaying a menu screen in which selected ones of a plurality of menus are arranged, the information processing apparatus comprising a display unit, an image data storage unit, an information recording unit, and a control unit, said method comprising the steps of:

storing image data of each of said plurality of menus in the image data storage unit;

creating menu display information, said menu display information determined by a selected arrangement of a selected subset of said plurality of menus;

recording the menu display information in the information recording unit; and displaying the menu screen under control of the control unit, responsive to the stored image data and the recorded menu display information, wherein, changing the recorded menu display information changes at least the order of arranging the menus displayed on the menu screen;

the step of creating menu display information comprises processing the menu display information in a host apparatus installed at a distant place, and the step of recording the menu display information includes the steps of transferring the menu display information from the host apparatus to the client information processing apparatus through a communication means before the menu display information is recorded in the information recording unit.

2. The method according to claim 1, wherein, on the menu screen, images calling attention are displayed on specific menus in the plurality of menus, the menu display information includes information which specifies menus on which the images calling attention are displayed, the data storage unit stores image data of images calling attention, the control unit displays images calling attention by superimposing the images on corresponding menus based on information which specifies menus, and changing the recorded menu display information changes menus on which images calling attention are displayed.

3. The method according to claim 2, further comprising the step of:

recording image data of images calling attention in the image data storage unit.

4. The method according to claim 3, further comprising the step of:

recording image data of images calling attention in the image data storage unit.

5. The method according to claim 1, wherein the step of creating menu display information comprises processing to be executed by operating an input means provided in the client information processing apparatus.

6. A method of managing a client information processing apparatus displaying a menu screen in which selected ones of a plurality of menus are arranged, the client information processing apparatus comprising a display unit, an image data storage unit, and a control unit, said method comprising the steps of:

storing image data of each of said plurality of menus and of image data of images calling attention in the image data storage unit;

creating menu display information, said menu display information determined by a selected arrangement of a selected subset of said plurality of menus and comprising at least information specifying menus on which images calling attention are displayed;

recording the menu display information in the information recording unit; and displaying the menu screen under control of the control unit, responsive to the stored image data and the recorded menu display information, wherein, changing the recorded menu display information changes at least the order of arranging the menus;

displaying the menu screen comprises superimposing images calling attention on specific menus in the plurality of menus the step of creating menu display information comprises processing the menu display information in a host apparatus installed at a distant place, and the step of recording menu display information includes the steps of transferring the menu display information created in the step of creating menu display information from the host apparatus to the client information processing apparatus through a communication means before the menu display information is recorded in the information recording unit.

7. The method according to claim 6, wherein the step of creating menu display information comprises processing to be executed by operating an input means provided in the client information processing apparatus.

8. A computer-readable storage medium storing a program for executing a method of managing client information processing apparatus displaying a menu screen in which selected ones of a plurality of menus are arranged, the client information processing apparatus comprising a display unit, an image data storage unit, an information recording unit, and a control unit, the program causing the client information processing apparatus to perform the steps of:

storing image data of each of said plurality of menus in the image data storage unit;

creating menu display information ,said menu display information determined by a selected arrangement of a selected subset of said plurality of menus;

recording the menu display information in the information recording unit; and displaying the menu screen under control of the control unit, responsive to the stored image data and the recorded menu display information, wherein, changing the recorded menu display information changes at least the order of arranging the menus displayed on the menu screen;

the step of creating menu display information comprises processing the menu display information in a host apparatus installed at a distant place, and the step of recording the menu display information includes the step of transferring the menu display information from the host apparatus to the client information processing apparatus through a communication means before the menu display information is recorded in the information recording unit.

9. A computer-readable storage medium storing a program for executing a method of managing client information processing apparatus displaying a menu screen in which selected ones of a plurality of menus are arranged, the client information processing apparatus comprising a display unit, an image data storage unit, an information recording unit, and a control unit, and the program causing the client information processing apparatus to perform the steps of:

storing image data of each of said plurality of menus and of image data of images calling attention in the image data storage unit;

creating menu display information ,said menu display information determined by a selected arrangement of a selected subset of said plurality of menus and comprising at least information specifying menus on which images calling attention are displayed;

recording the menu display information in the information recording unit;

displaying the menu screen under control of the control unit, responsive to the stored image data and the recorded menu display information, wherein:

changing the recorded menu display information changes at least the order of arranging the menus, displaying the menu screen comprises superimposing images calling attention on specific menus in the plurality of menus, the step of creating menu display information comprises processing the menu display information in a host apparatus installed at a distant place; and the step of recording menu display information includes the step of transferring and the menu display information created in the step of creating menu display information from the host apparatus to the client information processing apparatus through a communication means before the menu display information is recorded in the information recording unit.

10. An information processing system in which a terminal apparatus is managed by a host apparatus, said terminal apparatus displaying a menu screen in which selected ones of a plurality of menus are arranged and selection of the menus are received by the terminal apparatus, said terminal apparatus comprising:

a display unit displaying the menu screen, an image data storage unit that stores image data of each of said plurality of menus which can be displayed on the menu screen, an information recording unit that records menu display information, said menu display information being determined by a selected arrangement of a selected subset of said plurality of menus; and a control unit that controls display of the menu screen on the display unit, responsive to the stored image data and the recorded menu display information, wherein said host apparatus comprises a menu display information creation unit creating the menu display information; and a menu display information recording unit which transmits the menu display information created in the menu display information creation unit to the terminal apparatus information recording unit through a communication means which is effective to change at least the order of arrangement of the menus displayed on the menu screen of the terminal apparatus.

11. An information processing system in which a terminal apparatus is managed by a host apparatus, said terminal apparatus displaying a menu screen in which selected ones of a plurality of menus are arranged and selection of the menus are received by the terminal apparatus, said terminal apparatus comprising:

a display unit displaying the menu screen by superimposing images calling attention on specific menus in the plurality of menus, an image data storage unit that stores image data of each of said plurality of menus which can be displayed on the menu screen and image data of the images calling attention, an information recording unit that records menu display information having at least information specifying menus on which images calling attention are displayed, said menu display information being determined by a selected arrangement of a selected subset of said plurality of menus, and a control unit that controls display of the menu screen on the display unit, responsive to the stored image data and the recorded menu display information, wherein, said host apparatus comprises a menu display information creation unit which creates the menu display information; and a menu display information recording unit which transfers the menu display information, created in the menu display information creation unit, to the terminal apparatus information recording unit through a communication means which is effective to change at least the order of arrangement of the menus displayed on the terminal apparatus menu screen on which images calling attention are displayed.

* * * * *